Dec. 9, 1952  J. JANATKA  2,620,600
APPARATUS FOR THE MANUFACTURE OF MACHINE
ELEMENTS SIMILAR TO OR ANALOGOUS TO CAMS
Filed July 18, 1950  9 Sheets-Sheet 1

INVENTOR
JAROSLAV JANATKA
ATTORNEY

Dec. 9, 1952                    J. JANATKA                     2,620,600
                  APPARATUS FOR THE MANUFACTURE OF MACHINE
                  ELEMENTS SIMILAR TO OR ANALOGOUS TO CAMS
Filed July 18, 1950                                      9 Sheets-Sheet 2

INVENTOR
JAROSLAV JANATKA

Dec. 9, 1952            J. JANATKA            2,620,600
APPARATUS FOR THE MANUFACTURE OF MACHINE
ELEMENTS SIMILAR TO OR ANALOGOUS TO CAMS

Filed July 18, 1950            9 Sheets-Sheet 4

INVENTOR
JAROSLAV JANATKA

ATTORNEY

Dec. 9, 1952 J. JANATKA 2,620,600
APPARATUS FOR THE MANUFACTURE OF MACHINE
ELEMENTS SIMILAR TO OR ANALOGOUS TO CAMS
Filed July 18, 1950 9 Sheets-Sheet 5

INVENTOR
JAROSLAV JANATKA

ATTORNEY

INVENTOR
JAROSLAV JANATKA

ATTORNEY

Patented Dec. 9, 1952

2,620,600

UNITED STATES PATENT OFFICE 2,620,600

APPARATUS FOR THE MANUFACTURE OF MACHINE ELEMENTS SIMILAR TO OR ANALOGOUS TO CAMS

Jaroslav Janatka, Prague, Czechoslovakia, assignor of one-half to Ceskomoravska-Kolben-Danek, Narodni Podnik, Prague, Czechoslovakia, a corporation of Czechoslovakia Application July 18, 1950, Serial No. 174,432
In Czechoslovakia May 8, 1947

4 Claims. (Cl. 51—96)

This application is a continuation in part of my copending application Serial No. 23,466, filed on April 27, 1948, since abandoned, which application is based on my application filed in Czechoslovakia on May 8, 1947, under No. P. 2620-47.

My invention relates to a new method and to conformingly built machines for finishing non-circular but continuously curved faces of machine elements similar to or analogous to cams. More particularly my invention relates to a method and to machines for the production of master cams and to apparatuses copying cams therefrom.

One object of my invention is to provide a simple and reliable method and machine for the production of precision cams, particularly of cams used in high speed combustion engines.

Another object of my invention is to provide a new method and apparatus for the production of cams, particularly master cams cooperating with a flat follower, and to the application of such master cams in the production of cams cooperating with a follower roller.

Other objects of my invention together with the new principles underlying the same and its mode of operation will be apparent from the following specification when read with the accompanying drawings in which several embodiments of the mechanical features of my invention are illustrated.

The same reference characters indicate the same or equivalent parts in all figures.

The contour of cams as presently used is comprised of a series of circular arcs passing into each other. Such cams are relatively easy to produce. They have however the disadvantage that the acceleration diagram of the follower shows sudden jumps in the places where neighboring circular arcs meet. Such sudden changes of the acceleration of the follower have naturally unfavorable dynamic effects upon the valve gear.

A certain improvement of said cams can be attained if the cam contour is subdivided into a greater number of circular arcs. In this case the large jumps are distributed over a number of smaller jumps, and it is evident that any and all jumps may practically be avoided if such a high number of circular arcs are used that neighboring arcs differ only very little. In such case the curvature of the cam contours, and therefore also their acceleration diagrams, showing the dependency of the acceleration of the follower from the angle of rotation of the cam, are practically continuous. The lift diagram of the follower, for example of a valve, showing the dependency of the lift from the angle of rotation of the cam is usually given by a certain tabulation or functional equation and the desired contour of the cam is determined by coordinating a series of its points with an accuracy up to one hundredth or one thousandth of a millimeter. However, the continuity of the acceleration diagram may be preserved only if the designed contour of the cam may be precisely reproduced upon the actual cam. As the acceleration is proportional to the second derivate of the lift, even very small deviations from the desired cam contour, as easily occur during the manufacture, will result in a considerable and dangerous change of the acceleration diagram.

The existing methods for the manufacture of cams are not accurate and satisfactory to ensure a continuous acceleration of the follower because they are dependent upon the accuracy in the production of the master cam from which the cams are copied.

In accordance with my invention I utilize the evolute of the active cam contour in the manufacture of cams having a continuous acceleration diagram. This method enables a quick and inexpensive manufacture of cams and makes the precision of the cams practically independent from defects in the manufacture.

I have ascertained by extensive mathematical analysis that the active contours of cams cooperating with a flat follower having a continuous acceleration have evolutes consisting of one or two branches which evolutes can be easily determined and designed. This principle underlying my invention will be best understood from Figs. 1 and 2, and Figs. 3 and 4, respectively.

Figure 1:
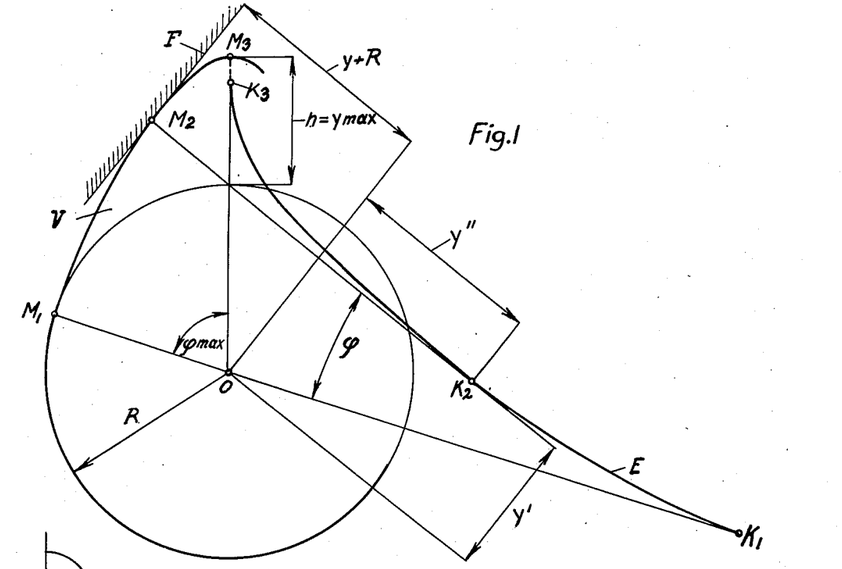
Figs. 1 and 2, and Figs. 3 and 4, respectively, are schematic and diagrammatic showings more particularly referred to in the specification to illustrate the basic principles of my invention.

Fig. 1 shows schematically the partial contour of a cam V intended to revolve upon its axis O and to cooperate with a flat follower F. The contour of the cam comprises a cylindrical portion having the radius R and an active portion $M_1$—$M_2$—$M_3$ (only its left branch being shown) to raise the follower continuously by the lift $y$, said lift increasing from $y=0$ in the contact point $M_1$ to $h=y$ max. in the contact point $M_3$ while the cam V is turned about its axis O by the angle $\varphi$ up to $\varphi$ max.

Figure 2:
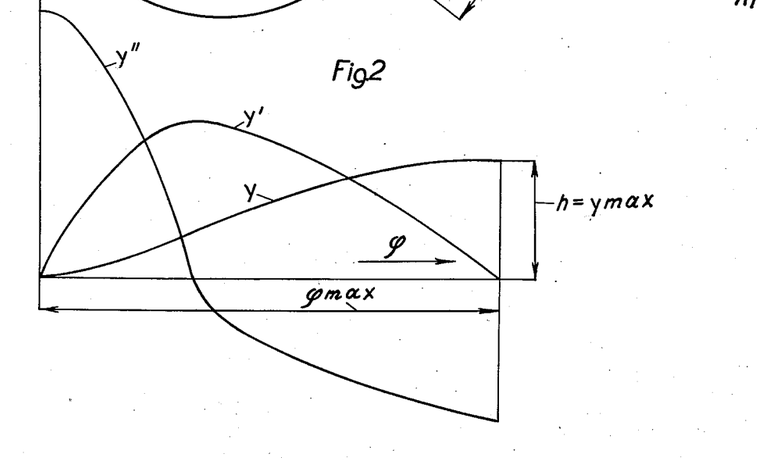

The curve $K_1$—$K_2$—$K_3$ indicates the evolute of said active surface $M_1$—$M_2$—$M_3$, the latter therefore representing the coordinated involute. The involute $M_1$—$M_2$—$M_3$ may easily be traced by the point $M_1$ of a flexible inextensible thread or the like $K_1$—O—$M_1$ which is connected to said evolute at $K_1$ and winds from said position $K_1$—O—$M_1$ over the position $K_1$—$K_2$—$M_2$ to the position $K_1$—$K_2$—$K_3$—$M_3$. Thus the evolute of a desired cam contour may be used for the manufacture of cams causing a continuous acceleration of the follower. Fig. 2 shows diagrammatically the functional relation between said angular displacement $\varphi$ of the cam V and the lift $y$ of the follower F. The curves $y'$ and $y''$ indicate the velocity and the acceleration, respectively, of the follower as a function of said angle $\varphi$, $y'$ and $y''$ being the first and second derivate, respectively, of $y$. The values of $\varphi$, $y'$, and $y''$ appear also in Fig. 1 and determine the points of the evolute E as indicated with respect to its point $K_2$.

Figures 3, 4:
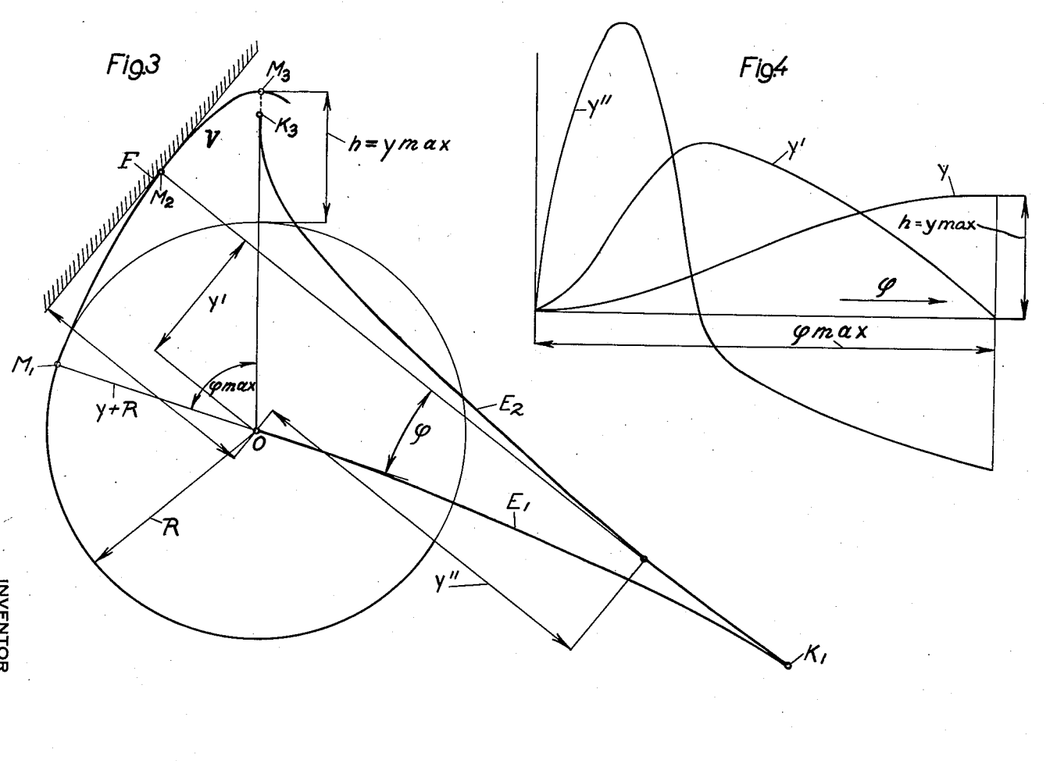

Fig. 3 differs from Fig. 1 only therein that the active cam surface $M_1$—$M_2$—$M_3$ requires a coordinated evolute consisting of two branches $E_1$ and $E_2$. These evolute branches have a common tangent in the common point $K_1$; the branch $E_1$ passes through the cam axis O. Fig. 4 shows diametrically, similar to Fig. 2, the functional relation between the angular cam displacement measured by the angle $\varphi$ and the lift $y$, the velocity $y'$ of the follower and its acceleration $y''$ caused by the active cam surface $M_1$—$M_2$—$M_3$.

Figure 5:
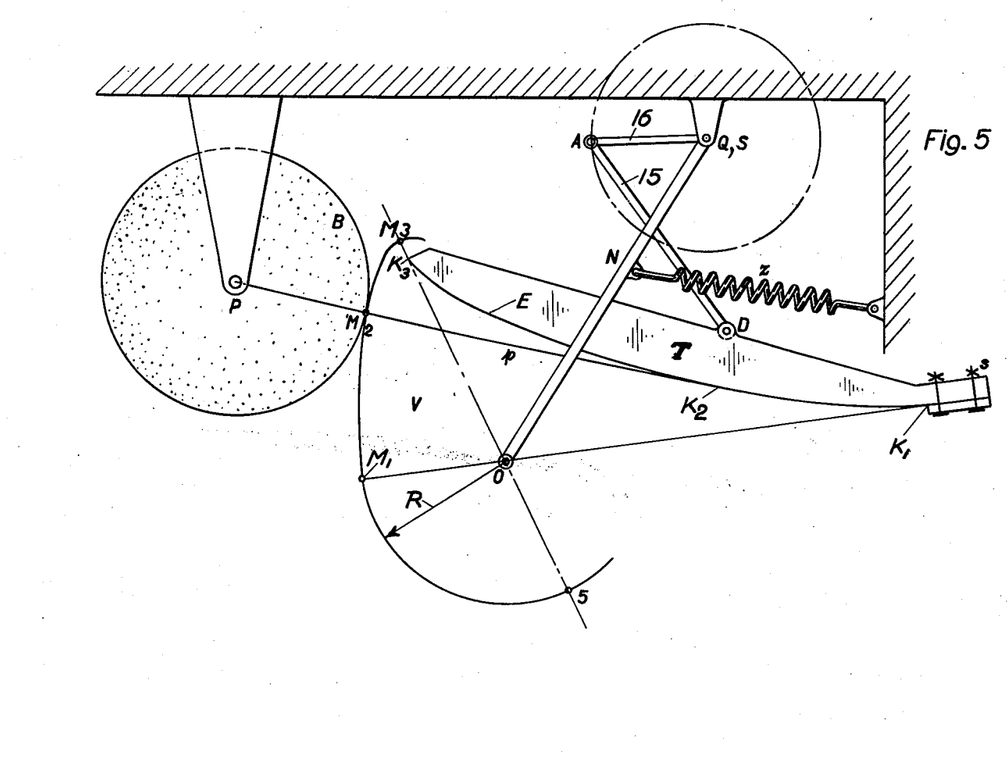
Figs. 5, 6, and 7 show in front view, partly schematically, three different arrangements of my new device for finishing cams, particularly master cams, intended to cooperate with a flat follower.
Figure 6:
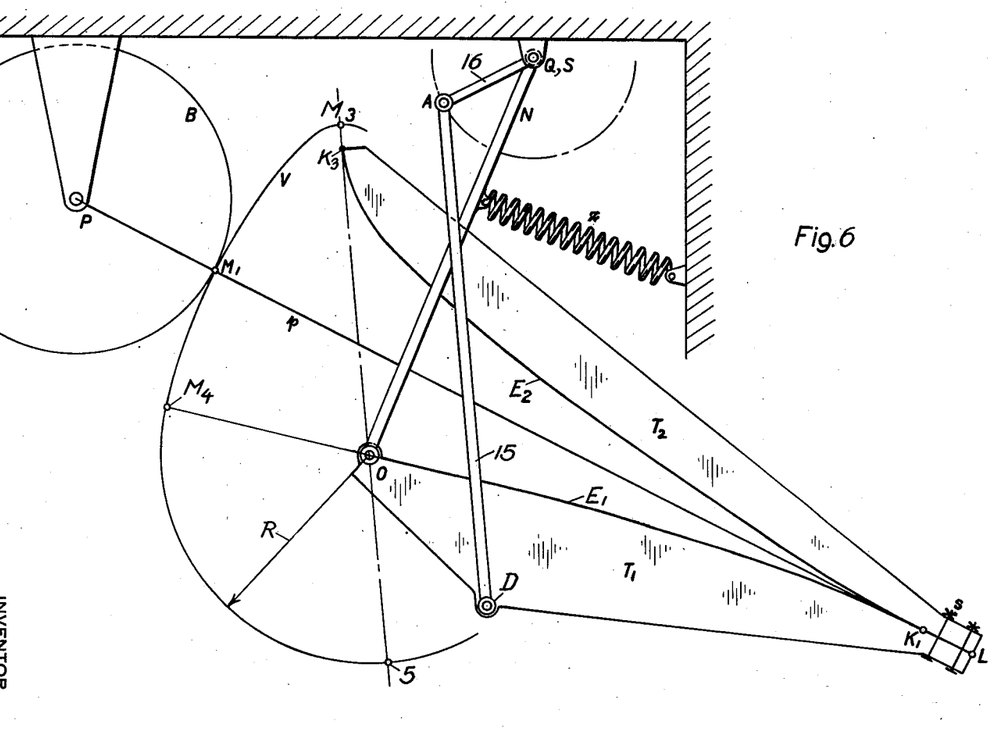
Figure 7:
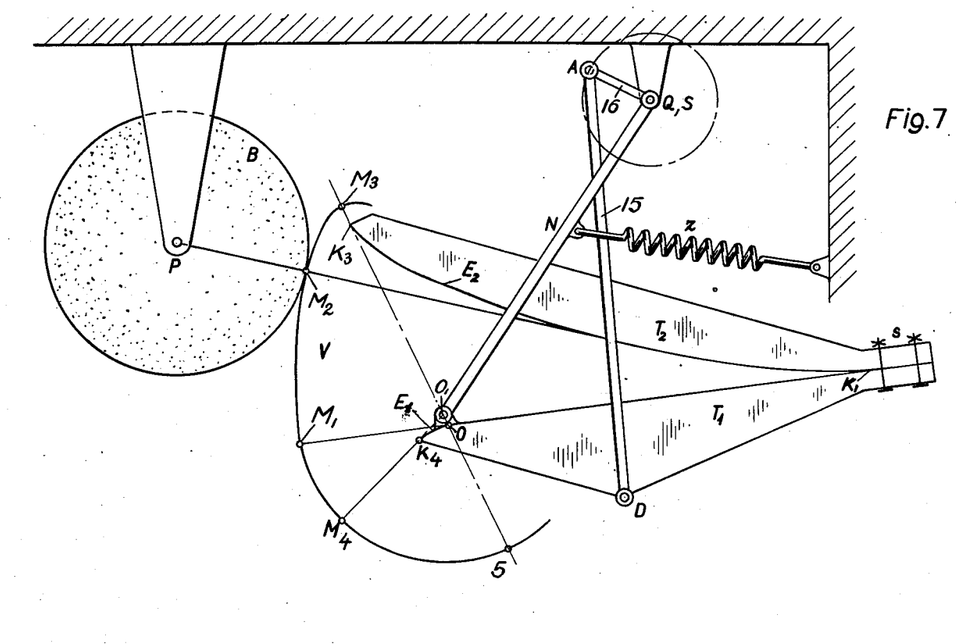

Figs. 5, 6, and 7, in which identical reference characters are used to indicate the same or equivalent parts, show three embodiments of a cam grinding apparatus according to my invention. These figures, though partly schematical, will enable anyone skilled in the art to construct a workable cam grinding apparatus utilizing my invention.

Fig. 5, which may be easily understod when compared with Figs. 1 and 2, shows the cam V to be shaped. This cam V is rigidly connected with the profile plate T which has a guiding surface E shaped in accordance with the evolute of the active surface $M_1$—$M_2$—$M_3$ of said cam. A flexible inextensible member, for example a steel tape $p$ is secured to said profile plate T by any suitable means beyond the guiding surface E, that is beyond its starting point $K_1$, the other end of said steel tape $p$ being loosely mounted upon the shaft P, for example by a loop freely surrounding the same. Said shaft P supports a grinding, cutting, or similar tool B used for the shaping of the active surface $M_1$—$M_2$—$M_3$ of the cam. In case that the steel tape $p$ has any appreciable thickness the guiding surface E is shaped to be equidistant with the true evolute of the active cam contour, the distance between said guiding surface E and the true evolute being equal to one half of the thickness of said tape.

The cam V, rigidly connected to the profile plate T, is rotatably mounted with its revolving center O upon the outswinging end of a swing lever N supported by the shaft Q. The tension spring $z$ attached with one end to said lever N and with its other end to the machine frame, keeps the steel tape $p$ in strained position. Another swing movement is imparted to the cam V and to the profile plate T fixed thereto by means of the crank mechanism 15, 16, causing the cam V and the plate T to swing over the cam center O. The arm 16 rotatably mounted upon a shaft S, which shaft may or may not be identical with the shaft Q supporting the swing lever N, actuates the connecting rod 15 linked thereto at A, the other end thereof being linked at D to the profile plate T. The length of the arm 16 and that of the connecting rod 15 may be adjustable to properly adjust the swing movement of the plate T and of the cam V attached thereto.

It will be well understood that the crank mechanism 15, 16 sets the profile plate T with the cam V rigidly connected thereto, both being rotatably supported by the swing lever N, into a swing motion about the cam center O. This swing motion causes the steel tape $p$ to unwind along the guiding surface E of the profile plate T from a tangential position (not shown) in point $K_1$ along a straight line connecting the points $K_1$—$M_1$—P to the shown position $K_1$—$K_2$—$M_2$—P and finally to a not shown position connecting the points $K_1$—$K_2$—$K_3$—$M_3$—P. During these movements the swing lever N actuated by the spring $z$ will keep the unwinding steel tape $p$ in strained position.

Thus the point of contact between the grinding tool B and the cam V will move from $M_1$ over $M_2$ to $M_3$, and the active surface on one side of the cam, namely $M_1$—$M_2$—$M_3$, will be shaped. If the cam is symmetrical, as it usually is, the other half of the active cam surface may be shaped by remounting the cam in reverse position, i. e. symmetrically to the shown original position, and by repeating the grinding process as described above. However, it is also possible to use a separate analogical mechanism to shape the other half of the active cam surface. In such case the first mechanism, as shown in Fig. 5, is switched off, and the other complementing mechanism is switched on as the grinding tool B reaches the vertex $M_3$ of the cam profile. The cylindrical base $M_1$—5 of the cam may be ground while the cam axis O is kept stationary and the cam revolved about the same.

While in the arrangement shown in Fig. 5 each half of active surface of the cam requires a continuous evolute, i. e. a one-branch evolute, the active surface of the cam may in many cases require a two-branch evolute for each half thereof as explained above with regard to Figs. 3 and 4. A machine utilizing such two-branch evolute for each half of the active cam surface is shown in Fig. 6.

According to this Fig. 6 the cam V, the contour of which is to be shaped, is rigidly connected with the profile plates $T_1$ and $T_2$. The guiding surfaces $E_1$ and $E_2$ of these profile plates contact in the point K where they have a common tangent. Beyond this point K the two profile plates are rigidly connected for example by screws S leaving in between a flexible inextensible member, for example a steel tape $p$ which with its other end is freely mounted upon a shaft P which supports a grinding tool for example a grinding wheel B used to shape the cam. The guiding surfaces $E_1$ and $E_2$ of the guide plates $T_1$ and $T_2$ are equidistant with the true evolute of the active cam contour $M_1$—$M_4$ and $M_1$—$M_3$, the distance between said guiding surfaces and the true evolutes being equal to one-half of the thickness of the tape $p$.

The cam V, to which the two profile plates $T_1$ and $T_2$ are rigidly connected is rotatably mounted with its revolving center O upon the outswinging end of a swing lever N supported by the shaft Q. The tension spring $z$ attached with one end to said lever N and with its other end to the machine frame, keeps the steel tape $p$ in strained position between its end points $K_1$ and P. Another swing movement, over the revolving center O the cam V, is imparted to the same and to the two profile plates $T_1$, $T_2$, connected thereto by means of the crank mechanism 15, 16. The arm 16 rotatably mounted upon a shaft S, which may or may not be identical with the shaft Q mentioned above, actuates the connecting rod 15 linked thereto, the other end thereof being linked to the profile plate $T_1$ at D. Here again, as stated above with reference to Fig. 5, the arm 16 and the connecting rod 15 may be adjustable with regard to their length to properly adjust the swing movement of the profile plates $T_1$, $T_2$ and of the cam V rigidly connected thereto.

It will be well understood that the crank mechanism 15, 16 sets the cam V with the two profile plates $T_1$, $T_2$, into a swinging motion about the cam center O while simultaneously the lever N swings about its shaft Q as the steel tape $p$ reels off the guiding surfaces $E_1$ and $E_2$. During this motion the point of contact between the grinding tool B and the cam V moves from $M_4$ over $M_1$ to $M_3$ and forms the active cam surface $M_4$—$M_1$—$M_3$.

Thus one half of the active cam contour is shaped. If the cam is symmetrical, as it usually is, the other half may be shaped by remounting the cam in reverse position, i. e. symmetrical to the original position, and repeating the grinding process as described above. However, it is also possible to use a separate analogical grinding mechanism to shape the other half of the cam surface. In such case the first mechanism is switched off and the second mechanism switched on as the grinding tool B reaches the other $M_3$ of the cam surface. The cylindrical base $M_4$—5 of the cam may be ground while the cam axis O is kept stationary and the cam revolves about the same.

The arrangement shown in Fig. 7 is essentially identical with that shown in Fig. 6. The profile plate $T_2$ with the guide surface $E_2$ is effective while the cam surface $M_1$—$M_2$—$M_3$ is shaped. The adjoining cam surface portion $M_1$—$M_4$, which leads into the circular cam surface portion $M_4$—5, is shaped with the help of the evolute $E_1$ arranged upon the outer portion O—$K_4$ of the guide surface of the profile plate $T_1$ the remaining portion O—$K_1$ thereof being plane and in tangential position to the guide surface $E_2$ in its point $K_1$. This arrangement also shows that the axis O around which the cam V will rotate does not necessarily have to be identical with the swing axis O'. The evolute E, passes through the cam axis O to make the velocity $y'=0$ in point $M_4$. However, of the velocity $y'$ in point $M_4$ can be greater than zero then the evolute $E_1$ may pass outside the cam axis O.

Figure 8:
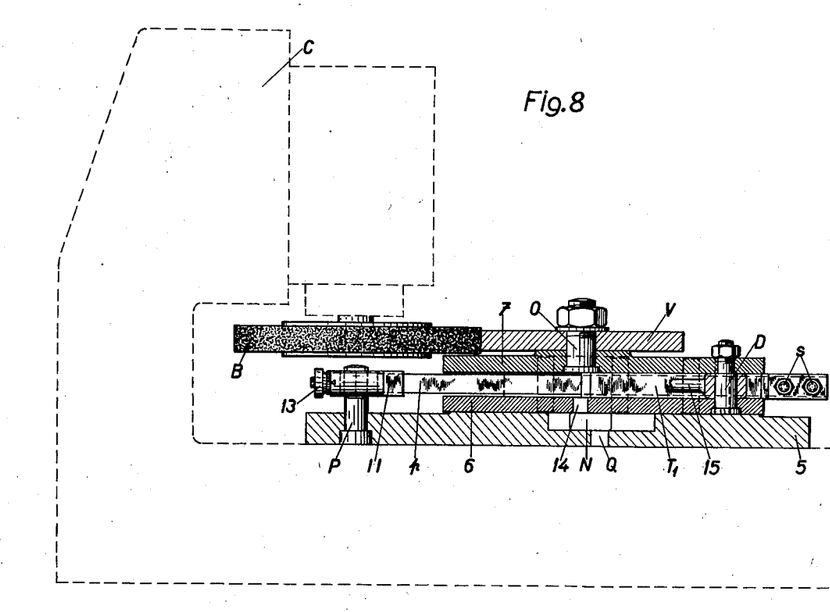
Figs. 8 and 9 show an elevational view, partly in section, and a top view, respectively, of a cam grinding machine according to my invention.
Figure 9:
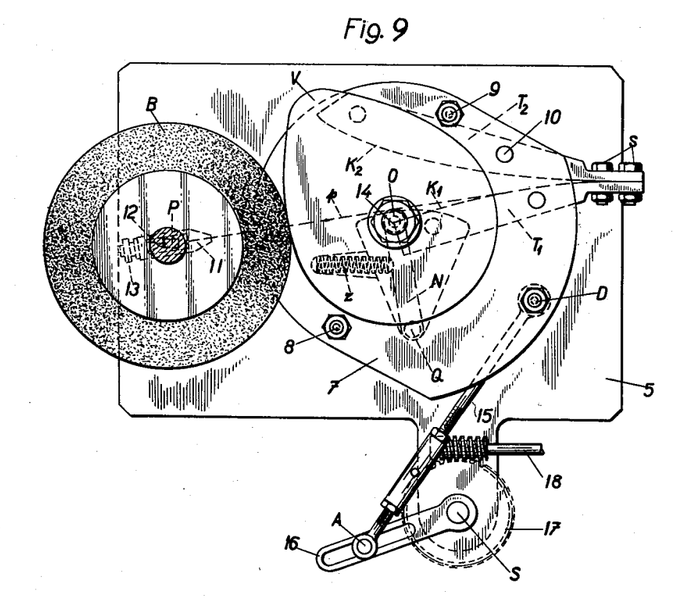

The cam grinding apparatus shown in Figs. 8 and 9 comprises a conventional grinding machine C with a grinding wheel B mounted on a vertical spindle, and the special attachment according to my invention to hold the cam to be ground and to guide the same during such grinding operation. This attachment is movably mounted upon a base plate 5 which is fixed to the work table of the machine frame shown in dotted lines. Said attachment is composed of a plurality of rigidly connected parts forming a gliding block and comprising the pair of parallel supporting plates 6 and 7, and the contour discs $T_1$ and $T_2$ mounted therebetween. The said contour discs $T_1$ and $T_2$ have guide surfaces $K_1$ and $K_2$ which are shaped to form the evolute of the active cam surface as more particularly described above with reference to Figs. 1 through 7. The said plates 6 and 7 are held together by the screws 8, 9 and D, and the discs $T_1$ and $T_2$ are fixed thereto by the pins 10. The cam V is rigidly attached to the outer surface of the upper plate 7 by the screw bolt O. A steel tape $p$ is interposed between the guide surfaces $K_1$ and $K_2$ of the contour discs $T_1$ and $T_2$ and one of its ends is secured between said discs by the screws s. The other end of the steel tape $p$ is pivotally connected to the bolt P which is mounted in the base plate 5. Such connection may be effected, as shown for example, by the clamping bridle 11 resting upon the knife edge 12. The cam V is brought into engagement with the grinding wheel B by adjusting the effective length of the steel tape $p$ for example with the help of the adjusting screw 13 attached to said bridle 11.

It will be well understood that the base plate 5 has to be so mounted that the axis of the bolt P, i. e. the swing axis of said bridle 11, coincides with the axis of the spindle of the grinding wheel B.

The movement of the said attachment upon the base plate 5 is governed as follows: The lower plate 6 is revolvably mounted upon the pivot 14 arranged upon the free end of the lever N which swings in a recess of the base plate 5 upon the bolt Q. Said lever N is pressed by the spring $z$ away from the grinding wheel B and thus the steel tape $p$ is constantly held in strained position. The unit composed of said plates 6, 7, said guide discs $T_1$ and $T_2$ and the cam V, oscillates upon the pivot 14 as described above, and this oscillation is actuated by the crank mechanism consisting of the connecting rod 15 which is jointed to the plates 6, 7 by the bolt D, and to the crank arm 16 of the crank shaft S. Said shaft is turned by the worm gearing 17, 18. The effective length of the crank arm 16 and the length of the connecting rod 15 are adjustable so that the proper swing movement around the pivot 14 may be imparted to the plates 6, 7 and to the cam V resting thereupon.

Figure 10:
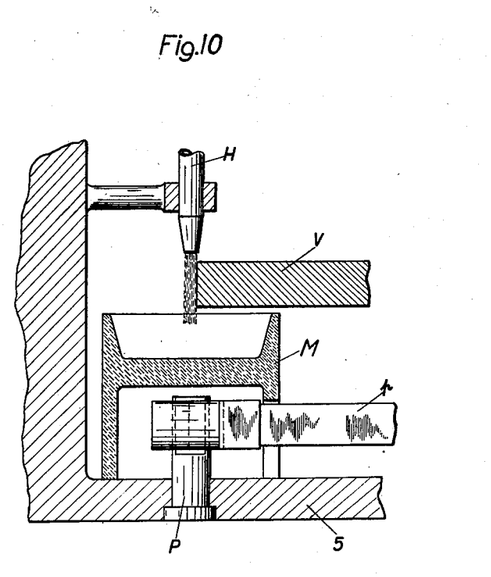
Fig. 10 shows an elevational sectional view of a modified part of the machine illustrated in Figs. 8 and 9.

The just described attachment may be utilized in combination with an autogenous cutting burner replacing the grinding wheel shown in Figs. 8 and 9. Such autogenous cutting burner is illustrated in Fig. 10. It will be well understood that the axis of the burner H, the flame of which cuts the cam V, has to coincide with the axis of the bolt P which pivotally supports one end of the steel tape $p$ cooperating with the guide discs $T_1$ and $T_2$ as shown in Figs. 8 and 9. A pan M arranged above said bolt P serves to collect the metal cut off from the cam V by the flame.

Figure 11:
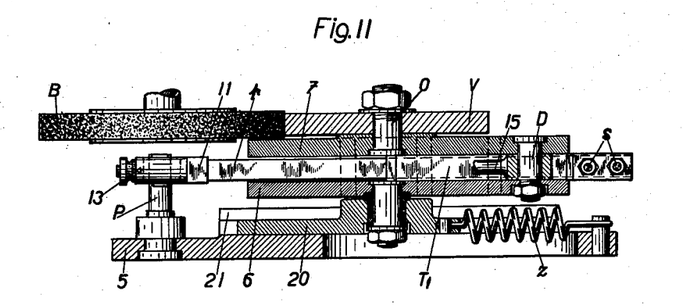
Figs. 11 and 12 show an elevational sectional view and a top view, respectively, of another modification of the grinding machine illustrated in Figs. 8 and 9.
Figure 12:
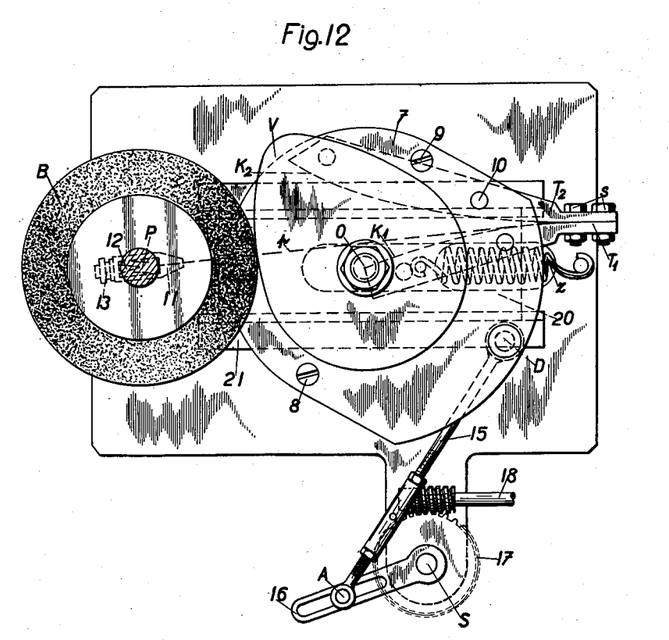

The embodiment shown in Figs. 11 and 12 differs from that shown in Figs. 8 and 9 only therein that the circular swing motion of the gliding block supporting the cam V is replaced by a linear motion thereof which motion supposes an imaginary lever N as shown in Figs. 8 and 9 of infinite length. The lower supporting plate 6 is pivotally mounted upon the slide 20 by means of the pivot 19 and said slide 20 moves between a pair of straight guide rails 21 which are mounted upon the base plate 5. A tension spring z attached with one end to said slide 20 and with the other end to the base plate 5 keeps the steel tape p in straight position as described before. The remaining parts of this embodiment and its operation are identical with those shown in Figs. 8 and 9.

The above described method and devices may be utilized with advantage for the production of active contours of cams designed for cooperation with follower rollers by using master cams co-operating with flat followers manufactured in accordance with my invention.

While specific embodiments of my invention have been shown and described in detail to illustrate the application of the principles of my invention, it will be understood that the same may be otherwise embodied by anyone skilled in the art without departing from such principles.

What I claim as my invention is:

1. A machine for finishing non-circular but continuously curved faces of machine elements similar or analogous to cams, said machine comprising a supporting structure, a cutting tool arranged in said structure, a pivot rotatably supporting the cam, means permitting a reciprocating movement of said pivot to keep the cam in contact with the cutting tool, means assuring such contact, means effecting an oscillating movement of said cam around said pivot, a guide member rigidly connected to said cam, the face of said guide member being shaped to form the evolute of the surface of the finished cam, an inextensible flexible tape attached with one end to the supporting structure and with its other end to that end of the evolute shaped face of the guide member which is farther removed from the cutting tool, said tape passing along the point of contact between said cutting tool and said cam.

2. A machine for finishing non-circular but continuously curved faces of machine elements similar or analogous to cams, said machine comprising a supporting structure, a cutting tool arranged in said structure, a pivot rotatably supporting the cam, means permitting a reciprocating movement of said pivot to keep the cam in contact with the cutting tool, means assuring such contact, means effecting an oscillating movement of said cam around said pivot, a pair of guide members rigidly connected to said cam, the faces of said guide members being shaped to form neighbouring branches of the evolute of the surface of the finished cams, an inextensible flexible tape attached with one end of the supporting structure, the other end of said tape to being clamped between the contacting ends of said guide members, said tape passing along the point of contact between said cutting tool and said cam.

3. A machine for finishing non-circular but continuously curved faces of machine elements similar or analogous to cams, said machine comprising a supporting structure, a rotatable cutting tool arranged in said structure, a pivot rotatably supporting the cam, means permitting a reciprocating movement of said pivot to keep the cam in contact with the cutting tool, means assuring such contact, means effecting an oscillating movement of said cam around said pivot, a guide member rigidly connected to said cam, the face of said guide member being shaped to form the evolute of the surface of the finished cam, an inextensible flexible tape fixed with one end in the axis of rotation of said cutting tool and attached with its other end to that end of the evolute shaped face of the guide member which is farther removed from the cutting tool.

4. A machine for finishing non-circular but continuously curved faces of machine elements similar or analogous to cams, said machine comprising a supporting structure, a rotatable cutting tool arranged in said structure, a pivot rotatably supporting the cam, means permitting a reciprocating movement of said pivot to keep the cam in contact with the cutting tool, means assuring such contact, means effecting an oscillating movement of said cam around said pivot, a pair of guide members rigidly connected to said cam, the faces of said guide members being shaped to form neighbouring branches of the evolute of the surface of the finished cam, an inextensible flexible tape fixed with one of the supporting structure in the axis of rotation of said cutting tool and clamped with its other end between the contacting ends of said guide members.

JAROSLAV JANATKA.

REFERENCES CITED

The following references are of record in the file of this patent:

UNITED STATES PATENTS

| Number | Name | Date |
|---|---|---|
| 1,135,780 | Drummond et al. | Apr. 13, 1915 |
| 2,046,060 | Crowley | June 30, 1936 |
| 2,209,538 | Rabe | July 30, 1940 |
| 2,387,167 | Miller | Oct. 16, 1945 |
| 2,428,215 | Hall | Sept. 30, 1947 |
| 2,553,831 | Musyl | May 22, 1951 |

FOREIGN PATENTS

| Number | Country | Date |
|---|---|---|
| 403,886 | Great Britain | Jan. 4, 1934 |